United States Patent
Hayes et al.

(10) Patent No.: US 8,613,834 B2
(45) Date of Patent: Dec. 24, 2013

(54) PAPER COATING OR BINDING FORMULATIONS AND METHODS OF MAKING AND USING SAME

(75) Inventors: Peter C. Hayes, Charlotte, NC (US); Ralph Lewis De Jong, Oakville (CA)

(73) Assignee: BASF SE (DE)

( * ) Notice: Subject to any disclaimer, the term of this patent is extended or adjusted under 35 U.S.C. 154(b) by 636 days.

(21) Appl. No.: 12/062,367

(22) Filed: Apr. 3, 2008

(65) Prior Publication Data
US 2009/0250183 A1 Oct. 8, 2009

(51) Int. Cl.
*D21H 17/33* (2006.01)
*D21H 17/35* (2006.01)
*D21H 21/18* (2006.01)
*D21H 21/28* (2006.01)
*C08F 212/08* (2006.01)
*C08F 236/06* (2006.01)
*C08F 236/22* (2006.01)
*C08F 251/02* (2006.01)

(52) U.S. Cl.
USPC ..... 162/169; 162/158; 162/164.1; 162/168.1; 162/162; 162/175; 526/317.1; 526/335; 526/340; 526/347; 527/300; 527/313; 527/314

(58) Field of Classification Search
USPC .......... 526/303.1, 317.1, 318, 319, 335, 340, 526/341, 347; 524/47, 48, 55, 734, 819, 524/827, 832, 457, 461; 527/300, 312, 527/313–314
See application file for complete search history.

(56) References Cited

U.S. PATENT DOCUMENTS

| | | | |
|---|---|---|---|
| 2,808,381 A * | 10/1957 | Stone | 524/48 |
| 3,479,349 A | 11/1969 | Allison et al. | |
| 4,112,155 A | 9/1978 | Carel et al. | |
| 4,233,167 A | 11/1980 | Sramek | |
| 4,370,389 A | 1/1983 | Ogura et al. | |
| 4,719,272 A | 1/1988 | Tsai et al. | |
| 4,822,668 A | 4/1989 | Tanaka et al. | |
| 4,866,151 A | 9/1989 | Tsai et al. | |
| 5,003,022 A | 3/1991 | Nguyen et al. | |
| 5,004,767 A | 4/1991 | Krause et al. | |

(Continued)

FOREIGN PATENT DOCUMENTS

| | | |
|---|---|---|
| CA | 2192381 | 6/1997 |
| DE | 19701524 | 7/1998 |

(Continued)

OTHER PUBLICATIONS

Smook, Gary A., Handbook of Pulp and Paper Terminology, Angus Wilde Publications, 1990, p. 283.*

(Continued)

*Primary Examiner* — Dennis Cordray
(74) *Attorney, Agent, or Firm* — Meunier Carlin & Curfman, LLC

(57) ABSTRACT

A paper coating or binding formulation comprises an aqueous polymer dispersion comprising a copolymer obtained by polymerization of an unsaturated monomer and a carbohydrate derived compound and a tetrasulfonate-based fluorescent whitening agent. The carbohydrate derived compound can be selected from the group consisting of dextrins, maltodextrins, and mixtures thereof. Methods of preparing a paper coating or binding formulation and improving the whitening properties of paper are also provided. Furthermore, paper including a copolymer obtained by polymerization of an unsaturated monomer and a carbohydrate derived compound and a tetrasulfonate-based fluorescent whitening agent is also disclosed.

39 Claims, 5 Drawing Sheets

(56) References Cited

U.S. PATENT DOCUMENTS

| | | |
|---|---|---|
| 5,026,746 A | 6/1991 | Floyd et al. |
| 5,032,659 A | 7/1991 | Heidel |
| 5,049,634 A | 9/1991 | Tsai et al. |
| 5,055,541 A | 10/1991 | Floyd et al. |
| 5,064,653 A | 11/1991 | Sessions et al. |
| 5,065,752 A | 11/1991 | Sessions et al. |
| 5,130,394 A | 7/1992 | Nguyen et al. |
| 5,130,395 A | 7/1992 | Nguyen et al. |
| 5,147,907 A | 9/1992 | Rinck et al. |
| 5,227,446 A | 7/1993 | Denzinger et al. |
| 5,278,217 A | 1/1994 | Umeda et al. |
| 5,334,287 A | 8/1994 | Hartmann et al. |
| 5,358,998 A | 10/1994 | Wendel et al. |
| 5,416,181 A | 5/1995 | Nguyen et al. |
| 5,461,093 A | 10/1995 | Yoo et al. |
| 5,461,094 A | 10/1995 | Yoo et al. |
| 5,523,372 A | 6/1996 | Fisk |
| 5,527,544 A | 6/1996 | Nguyen et al. |
| 5,536,779 A | 7/1996 | Wendel et al. |
| 5,539,019 A | 7/1996 | Suskind et al. |
| 5,543,459 A | 8/1996 | Hartmann et al. |
| 5,549,590 A | 8/1996 | Suskind et al. |
| 5,565,509 A | 10/1996 | Nguyen et al. |
| 5,567,744 A | 10/1996 | Nagata et al. |
| 5,578,678 A * | 11/1996 | Hartmann et al. ........... 525/54.3 |
| 5,622,749 A * | 4/1997 | Rohringer et al. ........... 427/158 |
| 5,667,885 A | 9/1997 | Nguyen et al. |
| 5,672,392 A | 9/1997 | De Clercq et al. |
| 5,677,374 A | 10/1997 | Hamunen et al. |
| 5,688,845 A * | 11/1997 | Eden et al. ................ 524/48 |
| 5,705,563 A | 1/1998 | Wendel et al. |
| 5,760,154 A | 6/1998 | Krause et al. |
| 5,847,065 A * | 12/1998 | Krause et al. ................ 527/300 |
| 5,916,928 A | 6/1999 | Sessions et al. |
| 5,945,127 A | 8/1999 | Breitenbach et al. |
| 5,948,153 A | 9/1999 | Ann et al. |
| 5,973,042 A | 10/1999 | Yoshinaga et al. |
| 6,030,443 A | 2/2000 | Bock et al. |
| 6,040,379 A | 3/2000 | Luebke et al. |
| 6,080,813 A | 6/2000 | Wendel et al. |
| 6,090,884 A | 7/2000 | Hurley et al. |
| 6,107,432 A | 8/2000 | Engelhardt et al. |
| 6,162,848 A | 12/2000 | Lattime et al. |
| 6,197,951 B1 | 3/2001 | Lenz |
| 6,235,965 B1 | 5/2001 | Beihoffer |
| 6,239,230 B1 | 5/2001 | Eckert et al. |
| 6,310,132 B1 | 10/2001 | Sackmann et al. |
| 6,358,557 B1 | 3/2002 | Wang et al. |
| 6,376,618 B1 | 4/2002 | Mitchell et al. |
| 6,391,451 B1 | 5/2002 | Mitchell et al. |
| 6,423,775 B1 | 7/2002 | Brune et al. |
| 6,426,381 B1 | 7/2002 | Konig et al. |
| 6,482,344 B1 | 11/2002 | Messner et al. |
| 6,548,578 B2 | 4/2003 | Pawlikowski |
| 6,551,457 B2 | 4/2003 | Westman et al. |
| 6,573,330 B1 | 6/2003 | Fujikake et al. |
| 6,583,220 B1 | 6/2003 | Lipman |
| 6,593,414 B2 | 7/2003 | Benton et al. |
| 6,607,819 B2 | 8/2003 | Wang et al. |
| 6,753,377 B1 | 6/2004 | Niinikoski et al. |
| 6,800,675 B1 | 10/2004 | Pfalz et al. |
| 6,803,107 B2 | 10/2004 | Mitchell et al. |
| 6,843,888 B2 | 1/2005 | Merrette et al. |
| 6,893,473 B2 | 5/2005 | Neogi et al. |
| 6,918,995 B2 | 7/2005 | Frolich et al. |
| 6,919,111 B2 | 7/2005 | Swoboda et al. |
| 6,969,444 B2 | 11/2005 | Linhart et al. |
| 7,008,979 B2 | 3/2006 | Schottman et al. |
| 7,056,957 B2 | 6/2006 | Omidian et al. |
| 7,056,969 B2 | 6/2006 | Cuch et al. |
| 7,138,367 B2 | 11/2006 | Hurry et al. |
| 7,258,815 B2 | 8/2007 | Drenker et al. |
| 7,329,701 B2 | 2/2008 | Herfert et al. |
| 7,348,065 B2 | 3/2008 | Ono et al. |
| 7,423,090 B2 | 9/2008 | Doane et al. |
| 7,425,595 B2 | 9/2008 | Savich et al. |
| 7,459,501 B2 | 12/2008 | Doane et al. |
| 7,470,763 B2 | 12/2008 | Shibata et al. |
| 2002/0124774 A1 | 9/2002 | Volpatti |
| 2003/0089888 A1 * | 5/2003 | Bacher et al. ............ 252/301.21 |
| 2003/0219600 A1 | 11/2003 | Mitchell et al. |
| 2004/0112559 A1 | 6/2004 | Du Boura et al. |
| 2004/0149410 A1 * | 8/2004 | Rohringer et al. ............ 162/162 |
| 2004/0250972 A1 | 12/2004 | Carr |
| 2005/0159315 A1 | 7/2005 | Doane et al. |
| 2005/0176878 A1 | 8/2005 | Etll et al. |
| 2005/0215153 A1 | 9/2005 | Cossement et al. |
| 2005/0239942 A1 | 10/2005 | Herfert et al. |
| 2006/0005933 A1 | 1/2006 | Okomori et al. |
| 2006/0089611 A1 | 4/2006 | Herfert et al. |
| 2006/0185808 A1 * | 8/2006 | Nguyen ........................ 162/162 |
| 2006/0252913 A1 | 11/2006 | Herfert et al. |
| 2006/0260509 A1 | 11/2006 | Evers |
| 2007/0015878 A1 | 1/2007 | Savich et al. |
| 2007/0031692 A1 | 2/2007 | Birkert et al. |
| 2007/0151688 A1 | 7/2007 | Solhage et al. |
| 2007/0167324 A1 | 7/2007 | Juana |
| 2007/0169903 A1 | 7/2007 | Covarrubias et al. |
| 2007/0193707 A1 * | 8/2007 | Nguyen ........................ 162/70 |
| 2008/0051494 A1 | 2/2008 | Savich et al. |
| 2008/0289786 A1 | 11/2008 | Koenig et al. |
| 2009/0019905 A1 | 1/2009 | Savich et al. |
| 2009/0038800 A1 | 2/2009 | Ravi et al. |
| 2009/0038801 A1 | 2/2009 | Ravi et al. |
| 2009/0069185 A1 | 3/2009 | Doane et al. |

FOREIGN PATENT DOCUMENTS

| | | |
|---|---|---|
| DE | 102007030102 | 1/2009 |
| DE | 102007030406 | 1/2009 |
| EP | 0408099 | 1/1991 |
| EP | 0806522 | 11/1997 |
| EP | 1489230 | 12/2004 |
| EP | 1712877 | 10/2006 |
| EP | 1743976 | 1/2007 |
| GB | 2050459 | 1/1981 |
| JP | 06-248032 | 9/1994 |
| WO | WO 01/11139 | 2/2001 |
| WO | 03091300 | 11/2003 |
| WO | WO 2005/056658 | 6/2005 |
| WO | 2007087320 | 8/2007 |
| WO | WO 2009123637 A1 * | 10/2009 |
| WO | 2010089334 | 8/2010 |

OTHER PUBLICATIONS

"Optical Brighteners", Ullmann's Encyclopedia of Industrial Chemistry, 2003, pp. 427-449 [online], [retrieved on Apr. 20, 2012]. Retrieved from the Internet: <URL: http://onlinelibrary.wiley.com/doi/10.1002/14356007.a18_153/pdf>.*

Bayer Solutions for Paper, Blankophor P liquid and Blankophor P150 liquid Flourescent Whitening Agents, pp. 1-3, www.solutionsforpaper.com.

Bayer Solutions for Paper, Blankophor PSG liquid Flourescent Whitening Agent, pp. 1-4, www.solutionsforpaper.com.

Findley, William R., "Fluorescent whitening agents for modern detergents," Journal of the American Oil Chemists' Society, vol. 65, No. 4, Apr. 1988, http://www.springerlink.com/content/w88t5uhn08772554.

"Fluorescent Whitening Agents for the Detergent Industry," 1 page, Mar. 6, 2008, http://www.didgeman.com/omid/bayer/bayer.swf.

Hawley's Condensed Chemical Dictionary, "Dextron Iron Complex", 1993, 12$^{th}$ edition, pp. 2991.

International Search Report and Written Opinion dated Mar. 30, 2009 for corresponding PCT application PCT/US2008/059295.

Kuntz, Lynn A., "Making the Most of Maltodextrins," Aug. 1997, Food Design, 6 pages, http://www.foodproductdesign.com/articles/0897DE.html.

Penford Products Co., "About Dextrin," pp. 1-3, Mar. 10, 2008, http://www.penford.com.au/main.php?ID=13.

Penford Products Co., "Penford Gum," Mar. 10, 2008, 1 page, http://www.penfordproducts.com/apps/starch02/pen_gum.asp.

(56) References Cited

OTHER PUBLICATIONS

Santos et al., "The Analysis of Fluorescent Whitening Agents Using Reversed-Phase HPLC and Mass Spectrometry," LCGD Asia Pacific vol. 7, No. 3, Sep. 2004, pp. 34-40, www.chromatographyonline.com.

Santos et al., "Subcritical water and dynamic sonication-assisted solvent extraction of fluorescent whitening agents and azo dyes in paper samples," ScienceDirect—Journal of Chromatography A, vol. 1064, Issue 2, Feb. 4, 2005, pp. 134-141, http://www.sciencedirect.com/science?_ob=ArticleURL&_udi=B6TG*-4F8TK97-5&_user.

Scientific Psychic, "Carbohydrates—Chemical Structure, Disaccharides consist of two simple sugars," Mar. 10, 2008, pp. 1-6, http://www.scientificpsychic.com/fitness/carbohydrates1.html.

Tegge, Günther, "Stärke and Stärkederivate", Hamburg: Behr, 1984, pp. 173 and 220.

International Preliminary Report on Patentability mailed Oct. 14, 2010 in co-pending International application No. PCT/US2008/059295, 4 pages.

Brochure, "Bayer AG Blancophor®" (1989).

Brochure, "Ciba® Tinopal® in Coating" (2000).

"Handbook of Paper and Board," cover, intro pages, pp. 81, 82, 109-114, 121-124 (Ed. H. Holik Wiley-VCH 2006).

International Search Report dated Sep. 26, 2011, issued in International Patent Application No. PCT/US2011/036603.

International Preliminary Report on Patentability dated Nov. 20, 2012, issued in International Patent Application No. PCT/US2011/036603.

Notice of Opposition filed by Omnova Solutions, Inc. against related EP Patent No. 2,262,949 (Mar. 28, 2013).

Notice of Opposition filed by Synthomer Deutschland GmbH against related EP Patent No. 2,262,949 (Mar. 21, 2013).

Synthomer Comparative Test Data (submitted on Mar. 21, 2013, in the Notice of Opposition filed by Synthomer Deutschland GmbH against EP 2,262,949).

Written Opinion dated Nov. 17, 2012, issued in International Patent Application No. PCT/US2011/036603.

\* cited by examiner

PAPER COATING OR BINDING FORMULATIONS AND METHODS OF MAKING AND USING SAME

TECHNICAL FIELD

This invention relates to paper coating and binding formulations, and more particularly to aqueous polymer dispersions and methods of making and using same for use in paper coating and binding formulations.

BACKGROUND

In the production of paper such as paper sheet, paperboard and cardboard, it is often important to provide a product with desirable aesthetic properties. For example, paper that is white and/or bright is more pleasing to a consumer and provides a greater contrast to the ink or other media provided thereon than paper that is less white or bright. Typically, the fibers used to form the paper are impregnated or coated with a binder composition that includes a polymer latex and one or more fillers that provide the desired whiteness or brightness of the paper.

One type of filler that is used for providing the desired whiteness or brightness of paper includes fluorescent whitening agents or FWA's. Fluorescent whitening agents can be based, for example, on sulfonated stilbene derivatives. In paper coating and binding formulations, the fluorescent whitening agents are provided with "activators" or "carriers" to provide the desired whitening effects of the fluorescent whitening agents on the paper. The Bayer publication Blankophor® P liquid/Blankophor® P150 liquid Fluorescent Whitening Agents describes the use of polyvinyl alcohol (PVOH), carboxylmethylcellulose (CMC) as carriers for use with fluorescent whitening agents. The presence of these carriers or activators, however, increases the viscosity of the coating or binding formulation and also increases the cost of the formulation.

SUMMARY

A paper coating or binding formulation comprises an aqueous polymer dispersion comprising a copolymer obtained by polymerization of an unsaturated monomer and a carbohydrate derived compound having a dextrose equivalent (DE) of about 10 to about 35; and a tetrasulfonate-based fluorescent whitening agent. The carbohydrate derived compound can have a molecular weight of about 3000 to about 20,000 and can be selected from the group consisting of dextrins, maltodextrins, and mixtures thereof. The copolymer can be a pure acrylic copolymer, a styrene acrylic copolymer, a styrene butadiene copolymer, or a vinyl acrylic copolymer. The copolymer can be derived from about 5 to about 45 percent by weight of the carbohydrate derived compound based on the total monomer weight. In some embodiments, the fluorescent whitening agent is not activated. The formulation can be substantially free of polyvinyl alcohol, carboxylmethylcellulose, polyvinylpyrrolidone and water-insoluble starches.

A method of preparing a paper coating or binding formulation includes polymerizing a mixture of an unsaturated monomer and a carbohydrate derived compound having a dextrose equivalent (DE) of about 10 to about 35, in an aqueous medium to produce a copolymer in an aqueous polymer dispersion; and mixing the aqueous polymer dispersion with a tetrasulfonate-based fluorescent whitening agent. The carbohydrate derived compound can be selected from the group consisting of dextrins, maltodextrins, and mixtures thereof.

A method of improving the whitening properties of paper includes providing an aqueous polymer dispersion comprising a copolymer obtained by polymerization of an unsaturated monomer and a carbohydrate derived compound having a dextrose equivalent (DE) of about 10 to about 35; mixing the aqueous polymer dispersion with a tetrasulfonate-based fluorescent whitening agent to produce a paper coating or binding formulation; and applying the formulation as a coating to paper. The aqueous polymer dispersion can be provided by polymerizing a mixture of an unsaturated monomer and a carbohydrate derived compound having a dextrose equivalent (DE) of about 10 to about 35, in an aqueous medium to produce the copolymer. The carbohydrate derived compound can be selected from the group consisting of dextrins, maltodextrins, and mixtures thereof.

Further, paper such as paper sheet, paperboard and cardboard comprises a fiber matrix and a binder composition comprising a copolymer obtained by polymerization of an unsaturated monomer and a carbohydrate derived compound having a dextrose equivalent (DE) of about 10 to about 35 and/or a molecular weight of about 3000 to about 20,000, and a tetrasulfonate-based fluorescent whitening agent. The carbohydrate derived compound can be selected from the group consisting of dextrins, maltodextrins, and mixtures thereof. The binder can be provided as a coating layer on a paper substrate.

The paper coating or binding formulations provide improvements in rheology such as runability on coating equipment and low cost while maintaining desirable whitening of the paper. It was unexpected that a copolymer derived from an unsaturated monomer and a carbohydrate derived compound having the DE or molecular weight described herein would provide desirable whitening of the paper even to levels comparable to those obtained when carriers or activators are used in the formulation.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
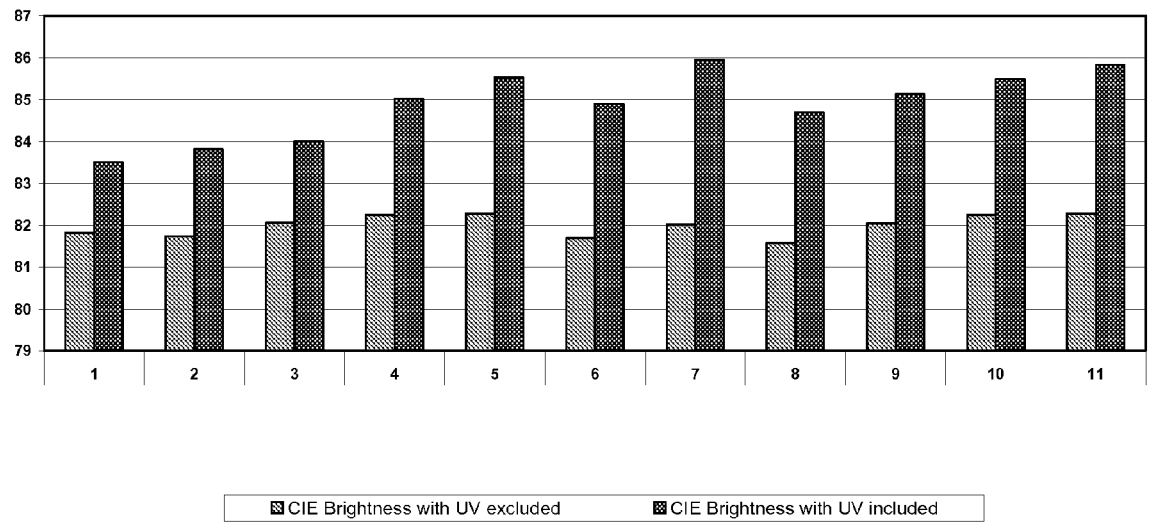
FIG. 1 is a graph showing the CIE brightness of paper free sheet samples including and excluding UV light.

The term "comprising" and variations thereof as used herein are used synonymously with the term "including" and variations thereof and are open, non-limiting terms. The term "paper" as used herein includes free sheet, paperboard, cardboard, and the like.

A paper coating or binding formulation comprises an aqueous polymer dispersion and a tetrasulfonate-based fluorescent whitening agent. The aqueous polymer dispersion comprises a copolymer obtained by polymerization of one or more unsaturated monomers and a carbohydrate derived compound. The aqueous polymer dispersion includes, as the disperse phase, particles of the copolymer including the carbohydrate derived compound dispersed in an aqueous dispersion medium or aqueous phase. The aqueous polymer dispersion can include the copolymer in an amount of 40-75% solids.

The copolymer can be a pure acrylic copolymer, a styrene acrylic copolymer, a styrene butadiene copolymer, or a vinyl acrylic copolymer. Suitable unsaturated monomers for use in forming the copolymer are generally ethylenically unsaturated monomers and include vinylaromatic compounds (e.g. styrene, α-methylstyrene, o-chlorostyrene, and vinyltoluenes); 1,2-butadiene (i.e. butadiene); conjugated dienes (e.g. 1,3-butadiene and isoprene); α,β-monoethylenically unsaturated mono- and dicarboxylic acids or anhydrides thereof (e.g. acrylic acid, methacrylic acid, crotonic acid, dimethacrylic acid, ethylacrylic acid, allylacetic acid, vinylacetic acid maleic acid, fumaric acid, itaconic acid, mesaconic acid, methylenemalonic acid, citraconic acid, maleic anhydride, itaconic anhydride, and methylmalonic anhydride); esters of α,β-monoethylenically unsaturated mono- and dicarboxylic acids having 3 to 6 carbon atoms with alkanols having 1 to 12 carbon atoms (e.g. esters of acrylic acid, methacrylic acid, maleic acid, fumaric acid, or itaconic acid, with C1-C12, C1-C8, or C1-C4 alkanols such as ethyl, n-butyl, isobutyl and 2-ethylhexyl acrylates and methacrylates, dimethyl maleate and n-butyl maleate); acrylamides and alkyl-substituted acrylamides (e.g. (meth)acrylamide, N-tert-butylacrylamide, and N-methyl(meth)acrylamide); (meth)acrylonitrile; vinyl and vinylidene halides (e.g. vinyl chloride and vinylidene chloride); vinyl esters of C1-C18 mono- or dicarboxylic acids (e.g. vinyl acetate, vinyl propionate, vinyl n-butyrate, vinyl laurate and vinyl stearate); C1-C4 hydroxyalkyl esters of C3-C6 mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g. hydroxyethyl(meth)acrylate, hydroxypropyl(meth)acrylate, and methylpolyglycol acrylate); and monomers containing glycidyl groups (e.g. glycidyl methacrylate).

Additional monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g. methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g. allylsulfonic acid, methallylsulfonic acid, styrenesulfonate, vinylsulfonic acid, allyloxybenzenesulfonic acid, 2-acrylamido-2-methyl-propanesulfonic acid, and their corresponding alkali metal or ammonium salts, sulfopropyl acrylate and sulfopropyl methacrylate); vinylphosphonic acid, dimethyl vinylphosphonate, and other phosphorus monomers; alkylaminoalkyl(meth) acrylates or alkylaminoalkyl(meth)acrylamides or quaternization products thereof (e.g. 2-(N,N-dimethylamino)ethyl (meth)acrylate, 3-(N,N-dimethylamino)propyl(meth) acrylate, 2-(N,N,N-trimethylammonium)ethyl(meth) acrylate chloride, 2-dimethylaminoethyl(meth)acrylamide, 3-dimethylaminopropyl(meth)acrylamide, and 3-trimethylammoniumpropyl(meth)acrylamide chloride); allyl esters of C1-C30 monocarboxylic acids; N-Vinyl compounds (e.g. N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monomers containing 1,3-diketo groups (e.g. acetoacetoxyethyl(meth)acrylate or diacetonacrylamide; monomers containing urea groups (e.g. ureidoethyl(meth)acrylate, acrylamidoglycolic acid, and methacrylamidoglycolate methyl ether); and monomers containing silyl groups (e.g. trimethoxysilylpropyl methacrylate).

The monomers can also include one or more crosslinkers such as N-alkylolamides of α,β-monoethylenically unsaturated carboxylic acids having 3 to 10 carbon atoms and esters thereof with alcohols having 1 to 4 carbon atoms (e.g. N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking monomers include diesters of dihydric alcohols with α,β-monoethylenically unsaturated monocarboxylic acids, of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate and methylenebisacrylamide. In some embodiments, the crosslinking monomers include alkylene glycol diacrylates and dimethacrylates, and/or divinylbenzene. The crosslinking monomers when used in the copolymer can be present in an amount of from 0.2% to 5% by weight based on the weight of the total monomer and are considered part of the total amount of monomers used in the copolymer.

In addition to the crosslinking monomers, small amounts (e.g. from 0.01 to 4% by weight based on the total monomer weight) of molecular weight regulators, such as tert-dodecyl mercaptan. Such substances are preferably added to the polymerization zone in a mixture with the monomers to be polymerized and are considered part of the total amount of unsaturated monomers used in the copolymer.

In some embodiments, the unsaturated monomers can include styrene, α-methylstyrene, (meth)acrylic acid, itaconic acid, maleic acid, fumaric acid, crotonic acid, methyl (meth)acrylate, ethyl(meth)acrylate, n-butyl(meth)acrylate, isobutyl (meth)acrylate,tert-butyl(meth)acrylate, 2-ethylhexyl(meth)acrylate, vinyl acetate, butadiene, (meth)acrylamide, (meth)acrylonitrile, hydroxyethyl(meth)acrylate and glycidyl(meth)acrylate.

In some embodiments, the copolymer can be a styrene acrylic copolymer derived from monomers including styrene, (meth)acrylic acid, (meth)acrylic acid esters, (meth)acrylamide, (meth)acrylonitrile, and mixtures thereof. For example, the styrene acrylic copolymer can include styrene and at least one of (meth)acrylic acid, itaconic acid, methyl(meth)acrylate, ethyl(meth)acrylate, n-butyl(meth)acrylate, isobutyl (meth)acrylate, tert-butyl(meth)acrylate, 2-ethylhexyl(meth)acrylate, (meth)acrylamide, (meth)acrylonitrile, and hydroxyethyl(meth)acrylate. The styrene acrylic copolymer can include from 39 to 69% by weight of (meth)acrylates, from 30 to 60% by weight of styrene, 0 to 3% by weight of (meth)acrylamide, and 0 to 10% by weight (meth)acrylonitrile. The styrene acrylic copolymer can also include from 0 to 5% by weight of one or more crosslinking monomers as described above such as alkylene glycol diacrylates and dimethacrylates.

In some embodiments, the copolymer can be a styrene butadiene copolymer derived from monomers including styrene, butadiene, (meth)acrylamide, (meth)acrylonitrile, itaconic acid and (meth)acrylic acid. The styrene butadiene copolymer can include from 40 to 75% by weight of styrene, from 25 to 60% by weight of butadiene, 1 to 10% of itaconic and/or (meth)acrylic acid, 0 to 3% by weight of (meth)acrylamide, and 0 to 20% by weight (meth)acrylonitrile. The styrene butadiene copolymer can also include from 0 to 5% by weight of one or more crosslinking monomers as described above such as divinylbenzene.

In some embodiments, the copolymer is derived from the unsaturated monomers in an amount of from greater than about 60 to less than 100 wt %, about 62 to about 95 wt %, about 65 to about 92 wt %, or about 70 to about 85 wt %, based on the total monomer weight (or dry polymer weight in the paper).

In addition to the unsaturated monomers, the copolymer is formed from a carbohydrate derived compound. The carbohydrate derived compound can have a dextrose equivalent (DE) of about 10 to about 35, about 12.5 to about 25, or about 15 to about 20. The DE value can be determined in accordance with the Lane and Eynon test method (International Standard ISO 5377: 1981). The weight average molecular weight ($M_w$) of the carbohydrate derived compound can be about 3000 to about 20,000, about 5000 to about 17,000, or about 8000 to about 14,000. The carbohydrate derived compound can be soluble in water at room temperature in an amount of greater than about 40%, greater than about 50%, or greater than about 60% by weight, or can even be completely soluble in water at room temperature. Solutions of the carbohydrate derived compound in an amount of 50% by weight in water at room temperature can have a viscosity of 100 to 1000 cp, or 200 to 500 cp.

In some embodiments, the carbohydrate derived compound can include dextrins, maltodextrins, or mixtures thereof. The dextrins, maltodextrins, or mixtures thereof can have the DE's, molecular weights, water solubilities, and viscosities described above. The dextrins and maltodextrins are generally degraded starches whose degradation is effected by heating with or without addition of chemicals, it being possible to recombine degradation fragments under the degradation conditions to form new bonds which were not present in this form in the original starch. Roast dextrins such as white and yellow dextrins that are prepared by heating moist-dry starch, usually in the presence of small amounts of acid, are less preferred. The carbohydrate derived compound can be prepared as described in Guinther Tegge, Starke und Starkederivate, Behr's Verlag, Hamburg 1984, p. 173 and p. 220 ff. and in EP 441 197.

The carbohydrate derived compound can be can be prepared from any native starches, such as cereal starches (e.g. corn, wheat, rice or barley), tuber and root starches (e.g. potatoes, tapioca roots or arrowroot) or sago starches. The carbohydrate derived compound can also have a bimodal molecular weight distribution and can have a weight average molecular weight as described above. The carbohydrate derived compound can have a nonuniformity U (defined as the ratio between the weight average weight $M_w$ and the number average molecular weight $M_n$) that characterizes the molecular weight distribution in the range from 6 to 12, from 7 to 11 or from 8 to 10. The proportion by weight of carbohydrate derived compound having a molecular weight of below 1000 can be from 10% to 70% by weight, or 20 to 40% by weight. In some embodiments, the carbohydrate derived compound in a 40% strength by weight aqueous solution can have a dynamic viscosity $\eta^{40}$ [Pa·s], determined in accordance with DIN 53 019 at 25° C. and a shear gradient of 75 $s^{-1}$, of from 0.01 to 0.06, 0.015 to 0.04, or 0.02 to 0.035.

In some embodiments, the carbohydrate derived compound can be chemically modified such as by etherification or esterification. The chemical modification can also can be carried out in advance on a starting starch before its degradation. Esterifications are possible using both inorganic and organic acids, or anhydrides or chlorides thereof Phosphated and acetylated degraded starches can also be used. The most common method of etherification is treatment with organohalogen compounds, epoxides or sulfates in aqueous alkaline solution. The ethers can be alkyl ethers, hydroxyalkyl ethers, carboxyalkyl ethers and allylethers.

The copolymer can be derived from greater than 0 to less than about 50 wt %, about 5 to about 45 wt %, about 8 to about 40 wt %, or about 15 to about 35 wt %, of the carbohydrate derived compound based on the total monomer weight (or dry polymer weight in the paper).

In addition to the copolymer, the paper coating or binding formulation includes a tetrasulfonate-based fluorescent whitening agent. Suitable tetrasulfonate-based fluorescent whitening agents include Blankophor® P liquid and Blankophor® P150 liquid from Bayer, which are tetrasulfonated derivatives of 4,4'-diamino-stilbene-2,2'-disulphonic acid, and Leucophor® T-100 from Clariant Paper Chemicals. A portion of the tetrasulfonate-based fluorescent whitening agent can be replaced with a hexasulfonate-based fluorescent whitening agent. Furthermore, although less preferred, up to about 50% of the tetrasulfonate-based fluorescent whitening agent can be replaced with a disulfonate-based fluorescent whitening agent. Hexasulfonate-based and disulfonate-based fluorescent whitening agents are known in the art.

In some embodiments, the fluorescent whitening agent is not activated. The formulation can be substantially free of an activator used for enhancing the brightening properties of the fluorescent whitening agent. Exemplary activators include polyvinyl alcohol, carboxylmethylcellulose, polyvinylpyrrolidone and water-insoluble starches. The water-insoluble starches are insoluble in water at 25° C. and are generally non-degraded. The water-insoluble starches generally have a MW greater than 100,000 (typically 200,000 to 500,000) and a DE of less than 5 (typically around 1). The formulation can be substantially free (e.g. less than 0.1 wt % based on the solid content of the formulation) of polyvinyl alcohol, carboxylmethylcellulose, polyvinylpyrrolidone and water-insoluble starches. The formulation can even be completely free of polyvinyl alcohol (PVOH), carboxylmethylcellulose (CMC), polyvinylpyrrolidone (PVP) and water-insoluble starches. In some embodiments, an activator can be used but in an amount substantially less than the amount typically used in paper formulations. For example, less than 25% or even less than 10% of the amount of activator typically used can be included in the formulation, or less than 0.4 wt % or even less than 0.2 wt % based on the total formulation. The weight ratio of the activator to the fluorescent whitening agent is less than 1:1, less than 0.5:1, less than 0.2:1, less than 0.1:1, or even 0:1.

The paper binding or coating formulation can include fillers, dyes and/or pigments. Fillers can be added to impart certain properties to the paper such as smoothness, whiteness, increased density or weight, decreased porosity, increased opacity, flatness, glossiness, and the like. Suitable fillers include calcium carbonate (precipitated or ground), kaolin, clay, talc, diatomaceous earth, mica, barium sulfate, magnesium carbonate, vermiculite, graphite, carbon black, alumina, silicas (fumed or precipitated in powders or dispersions), colloidal silica, silica gel, titanium oxide, aluminum hydroxide, aluminum trihydrate, satine white, magnesium oxide, plastic pigments, white urea resin pigments, and rubber powder.

If the paper is to be a colored or patterned paper, dyes and/or pigments can also be included. Exemplary dyes include basic dyes, acid dyes, anionic direct dyes, cationic direct dyes, anionic pigment dispersions, and cationic pigment dispersions. Various organic pigments and inorganic pigments can be used as coloring agents including non-toxic anticorrosive pigments. Examples of such pigments are phosphate-type anticorrosive pigments such as zinc phosphate, calcium phosphate, aluminum phosphate, titanium phosphate, silicon phosphate, and ortho-and fused phosphates of these; molybdate-type anticorrosive pigments such as zinc molybdate, calcium molybdate, calcium zinc molybdate, potassium zinc molybdate, potassium zinc phosphomolybdate and potassium calcium phosphomolybdate; and borate-type anticorrosive pigments such as calcium borate, zinc borate, barium borate, barium meta-borate and calcium meta-borate.

In some embodiments, the paper binding or coating formulation can include a polymer binder that has not been derived from the carbohydrate derived compound. The polymer binder can be a pure acrylic copolymer, styrene acrylic copolymer, styrene butadiene copolymer, vinyl acrylic copolymer, or a mixture thereof. For example, a styrene acrylic copolymer or a styrene butadiene copolymer could be included.

In some embodiments, the paper binding or coating formulation can include a thickener. Suitable thickeners include (meth)acrylic acid/alkyl(meth)acrylate copolymers (e.g. Sterocoll® FD thickener and Sterocoll® FS thickener, both of which are commercially available from BASF Corporation), hydroxyethyl cellulose, guar gum, jaguar, carrageenan, xanthan, acetan, konjac mannan, xyloglucan, urethanes and mixtures thereof. The thickener can be added to the formulation as an aqueous dispersion or emulsion, or as a solid powder.

In some embodiments, the paper binding or coating formulation can include other additives. The additives can be any additive that can be generally included in a paper coating or binding composition. Further additives include surfactants, wetting agents, protective colloids, biocides, dispersing agents, thixotropic agents, freeze store stability additives, pH adjusting agents, corrosion inhibitors, ultraviolet light stabilizers, crosslinkers, crosslinking promoters, and lubricants.

The paper binding or coating composition can include greater than 50% solids, 55 to 75% solids, or 60 to 70% solids. The copolymer can be present in an amount of 2 to 12 wt %, 4 to 10 wt %, or 6 to 9 wt % of the solid content. The tetrasulfonate fluorescent whitening agent can be present in an amount of greater than 0 to 2 wt % or 0.5 to 1.5 wt % of the solid content. Other polymeric binders can be present in an amount of 0 to 5 wt %, 0 to 3 wt % or 0 to 1 wt % of the solid content. A thickener can be present in an amount of 0 to 5 wt %, greater than 0 to 3 wt % or greater than 0 to 1 wt % of the solid content. The fillers, pigments and or/dyes can be present in an amount of 82 to 95 wt % or 85 to 90 wt % of the solid content. Other additives can be present in an amount of 0 to 5 wt %, 0 to 3 wt % or 0 to 1 wt % of the solid content.

The aqueous polymer dispersions can be prepared by polymerizing the unsaturated monomers using free-radical aqueous emulsion polymerization in the presence of the carbohydrate derived compound. Suitable methods are described in U.S. Pat. No. 6,080,813, which is hereby incorporated by reference in its entirety. The emulsion polymerization temperature is generally from 30 to 95° C. or from 75 to 90° C. The polymerization medium can include water alone or a mixture of water and water-miscible liquids, such as methanol. In some embodiments, water is used alone. The emulsion polymerization can be carried out either as a batch process or in the form of a feed process, including a step or gradient procedure. In some embodiments, a feed process is used in which part of the polymerization batch is heated to the polymerization temperature and partially polymerized, and the remainder of the polymerization batch is subsequently fed to the polymerization zone continuously, in steps or with superposition of a concentration gradient, usually via a plurality of spatially separate feed streams, of which one or more contain the monomers in pure or emulsified form, while maintaining the polymerization. The initially introduced mixture and/or the monomer feed stream can contain small amounts of emulsifiers, generally less than 0.5% by weight, based on the total amount of monomers to be polymerized. The monomers can be frequently fed to the polymerization zone after pre-emulsification with these assistant emulsifiers. The feed process can be designed by initially introducing all of the carbohydrate derived compound to be used in dissolved form in an aqueous mixture. This means that the aqueous solution produced on partial hydrolysis of the starting starch can, after the hydrolysis has been terminated to form the carbohydrate derived compound, for example by neutralization of the catalytic acid and cooling, be further used directly for the aqueous emulsion polymerization. Prior isolation of the carbohydrate derived compound, for example by spray drying, is unnecessary but can also be used.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In the combined systems, the carbohydrate derived compound can also be used as the reducing component. In general, the amount of free-radical initiator systems employed is from 0.1 to 2% by weight, based on the total amount of the monomers to be polymerized. In some embodiments, the initiators are ammonium and/or alkali metal peroxydisulfates (e.g. sodium peroxydisulfates), alone or as a constituent of combined systems.

The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

The aqueous polymer dispersions can be prepared with total solids contents of from 10 to 75% by weight, 15 to 65% by weight, or 20 to 60% by weight. The aqueous polymer dispersions can then be concentrated if desired to provide a total solids content of 40-75% by weight. The aqueous polymer dispersion can be converted, in a manner known per se, to redispersible polymer powders (e.g., spray drying, roll drying or suction-filter drying). If the aqueous polymer dispersion is to be dried, drying aids can be used with the dispersion. The copolymers have a long shelf life and can be redispersed in water for use in the paper coating or binding formulation.

The aqueous polymer dispersion can be mixed with the tetrasulfonate-based fluorescent whitening agent and optionally other components such as polymeric binders, thickeners, fillers, pigments, dyes, and other additives. The order of mixing is not critical although enough water needs to be present in the formulation for the addition of solid components such as certain fillers.

The coating or binding formulation can be applied to the paper as a coating. If the formulation is provided as a coating, it can be applied using any known method in the art such as roll coating, blade coating, or metered size press. The formulation can be provided in an amount of 7-20 g/m$^2$ per 150 g/m$^2$ of paper. In some embodiments, the formulation can be applied in an amount of less than 15% by weight or 4 to 12% by weight based on the weight of the coated paper.

The resulting paper such as paper sheet, paperboard and cardboard comprises a fiber matrix and a binder composition comprising a copolymer obtained by polymerization of an unsaturated monomer and a carbohydrate derived compound and a tetrasulfonate-based fluorescent whitening agent. The binder can be provided as a coating layer on a paper substrate. The paper substrate that is coated with the formulation can be any paper substrate including, but not limited to paper, paper board and cardboard. The formulation can be used with any type of paper coating process such as rotogravure, sheet offset, web offset, and flexographic processes.

In this application, the weight average molecular weight data for the carbohydrate derived compound, unless expressly stated otherwise, is determined using gel permeation chromatography (GPC), carried out under the following conditions:

Columns: 3 steel units measuring 7.5×600 mm, filled with TSK gel G 2000 PW; G 3000 PW and G 4000 PW. Mesh 5 μm
Eluent: Distilled water.
Temp.: RT (room temperature)
Detection: Differential refractometer (for example ERC 7511)
Flow rate: 0.8 ml/min, pump (for example ERC 64.00)
Injection vol.: 20 μl, valve (for example VICI 6-way valve)
Evaluation: Bruker Chromstar GPC software
Calibration: The calibration was carried out in the low-molecular-weight range using glucose, raffinose, maltose and maltopentose. For the higher-molecular-weight range, pullulan standard having a polydispersity <1.2 was used.

As described herein, the Prufbau offset test was conducted as follows:
1. Definitions
  1.1. Impressions—passes through the machine.
  1.2. Picking—the lifting of any portion of a paper or coating surface during the printing impressions due sometimes to inadequate sizing and sometimes to ink being excessively tacky.
2. Procedure
  2.1. Apparatus/Reagent Requirements
    2.1.1. Multipurpose print test machine (System Dr. Druner—Prufbau)
    2.1.2. Ink—Novagloss 4 G 655-K+EA Standard Offset Testing ink
    2.1.3. Printing Form—4 cm wide aluminum disc
    2.1.4. Printing Pressure—800 N
    2.1.5. Printing Speed—1 m/s constant
    2.1.6. Inking Unit Requirements—0.3 mL ink per sample, distribution time—30 seconds, printing form inking time—30 seconds
      2.1.6.1. Only one disc should be used from each inking station, which is cleaned afterwards, so that fresh ink is used for each sample.
      2.1.6.2. If more than four tests are to be made, the rubber roll should be cleaned.
  2.2. Procedure Steps
    2.2.1. Prepare the sample (paper or paperboard) by allowing it to condition for 24 hours under standard TAPPI conditions. The conditioning should be maintained throughout testing
    2.2.2. Cut samples to measure approximately 240 mm±2 mm by 47±0.5 mm. If the sample is too wide, it may interfere with the run through the apparatus. If the sample is too narrow, it may result in the sample running off sideways, or askew.
    2.2.3. Place the sample under clip located at the end of the sample carrier and fold sample back 180° so that it lies flat and parallel on the carrier with the side to be tested uppermost. Secure the free end with tape. Do not allow fingerprints to contaminate the portion of the sample to be tested.
    2.2.4. The mounted sample is placed in the track before the printing station, and the printing disc installed. The carrier should have the clip to the rear, so that the taped end of the sample is printed first.
    2.2.5. Print the sample.
    2.2.6. With the same printing disc, after a 10 second pause, print again. Note: the length of the pause may be adjusted to achieve desired pick. Do not clean the disc between printings.
    2.2.7. After another pause of the same duration, print the sample again. The sample is either printed a certain number of times or until it begins to pick, in which case the number of printings is noted.
    2.2.8 The number of impressions that are made when picking occurs is noted. If picking does not occur on the last impression, the symbol > and the number of the last impression is noted. Note: Through progressive drying on both the paper and the printing disc, the ink becomes tackier. The paper is then subject to increasing force from print to print. The more closed the coating is against the fluid portion of the ink, (the slower the rise in the ink's viscosity), the more passes are possible before picking begins.

As described herein, the Prufbau wet pick test was conducted as follows:

1. Procedure
  1.1. Apparatus/Reagent Requirements
    1.1.1. Multipurpose print test machine (Prufbau with wetting unit attached)
    1.1.2. Ink—Testing ink
    1.1.3. Printing Form—4 cm wide blanket disc
    1.1.4. Printing Pressure—600 N
    1.1.5. Printing Speed—3 m/s constant
    1.1.6. Wetting Unit Speed—1 m/s constant
    1.1.7. Inking Unit Requirements—approximately 0.16 mL
    1.1.8. Fountain Solution—10 µL of 90/10 blend of water and isopropyl alcohol (The amount of solution may be increased to achieve pick.)
    1.1.9. Wetting Unit delay timer adjusted to achieve pick. (Start at 1 second, then adjust delay on control sample as needed to see pick.
  1.2. Procedure Steps
    1.2.1. Prepare the sample (paper or paperboard) by allowing it to be conditioned for 24 hours under standard TAPPI conditions. The conditioning should be maintained throughout testing. Cut samples to measure approximately 240 mm±2 mm by 47±0.5 mm. If the sample is too wide, it may interfere with the run through the apparatus. If the sample is too narrow, it may result in the sample running off sideways, or askew.
    1.2.2. Place the sample under clip located at the end of the sample carrier and fold sample back 180° so that it lies flat and parallel on the carrier with the side to be tested uppermost. Secure the free end with tape. Do not allow finger prints to contaminate the portion of the sample to be tested.
    1.2.3. Turn power and cooling unit on. Place ink distribution roll in contact with the drive rolls. Turn distributor rolls on and allow to run for at least 15 minutes prior to testing to allow temperature control balance.
    1.2.4. Place carrier, with the sample attached, in carrier slot in front of the wetting unit.
    1.2.5. Fill wetting unit pipette to 10 µl with fountain solution and place in the wetting unit.
    1.2.6. Stop ink distribution rollers and apply approximately 0.16 ml (1.6 turns on ink pipette) ink to the roller station.
    1.2.7. Start the ink distribution rollers and timer simultaneously.
    1.2.8. At 30 seconds elapsed time, place the blanketed print disc in contact with the ink roller.
    1.2.9. Release fountain solution at the same time on each sample in the series (50 to 54 seconds range). Start the fountain rollers at the release of solution.
    1.2.10. At 60 seconds elapsed time, remove print disc from ink roll and mount on the printing unit core. Start the core motor.
    1.2.11. At the time of the fountain alarm, lift the lever on the fountain. This will send the carrier through the wetting and printing stations.
    1.2.12. Remove the test strip from the carrier and allow the ink to dry before reading the ink density.
    1.2.13. Stop the core drive motor and the fountain unit.
    1.2.14. Repeat steps 1.2.4 through 1.2.13 for each sample to be tested.
    1.2.15. With the aid of densitometer, read ink density in 10 dry areas and in 10 wet areas of each strip. Report average density in the dry area. Report average density in the wet area. Report % retention of ink ((Wet Average/Dry Average)×100)).

EXAMPLES

A standard coated free sheet coating color was formulated utilizing 70 parts of Hydrocarb® 90 ground calcium carbonate and 30 parts Hydralux® 91 fine kaolin clay. The binder level of the coating formulation was set at 12 parts. Binders evaluated were Styronal® BN 4606 latex binder as a commercial control. The carboxylated styrene-butadiene emulsion polymers containing 58% styrene, 38% butadiene, and 4% acrylic acid were used as laboratory controls (Comparative Examples 1 and 2). Two separate laboratory polymerized binders (Examples 1 and 2) were prepared in the same manner as Comparative Examples 1 and 2 except that the binder copolymers were derived using 30 parts of a maltodextrin compound per 100 parts of monomer (i.e., styrene, butadiene and acrylic acid). The maltodextrin compound had a DE=18 and a $M_w$ of 11,000. Blancophor® P, a tetrasulfonated derivative of 4,4'-diamino-stilbene-2,2'-disulphonic acid, was used as a fluorescent whitening agent in all formulations. Standard all-synthetic formulations utilizing Sterocoll® FD as a thickener were also compared to formulations utilizing standard activators for the fluorescent whitening agent, including polyvinyl alcohol (PVOH) (Elvano® 51-03L24); carboxymethylcellulose (CMC) (Finnfix® 10) and a water insoluble starch (Penford® Gum 280). In formulations where the activators were used, the level of Sterocoll® FD was decreased for viscosity considerations; however, binder level adjustments were only made in the conditions where two parts of starch by weight were used as the activator. Calsan® 50, a calcium stearate from BASF Corporation, was used as a lubricant. Eleven coating formulations were prepared as shown in Table 1.

TABLE 1

| | Formulation | | | | | | | | | | |
| --- | --- | --- | --- | --- | --- | --- | --- | --- | --- | --- | --- |
| | 1 | 2 | 3 | 4 | 5 | 6 | 7 | 8 | 9 | 10 | 11 |
| Hydrocarb 90 | 70 | 70 | 70 | 70 | 70 | 70 | 70 | 70 | 70 | 70 | 70 |
| Alphalux 91 | 30 | 30 | 30 | 30 | 30 | 30 | 30 | 30 | 30 | 30 | 30 |
| Stryonal BN 4606 | 12 | | | | | | | | | | |
| Comparative Example 1 | | 12 | | | | 12 | | 11 | | 12 | |
| Comparative Example 2 | | | 12 | | | | | | | | |
| Example 1 | | | | 12 | | | 12 | | 11 | | 12 |
| Example 2 | | | | | 12 | | | | | | |
| Blancophor P | 1 | 1 | 1 | 1 | 1 | 1 | 1 | 1 | 1 | 1 | 1 |

TABLE 1-continued

| | Formulation | | | | | | | | | | |
|---|---|---|---|---|---|---|---|---|---|---|---|
| | 1 | 2 | 3 | 4 | 5 | 6 | 7 | 8 | 9 | 10 | 11 |
| Sterocoll FD | 0.3 | 0.3 | 0.3 | 0.3 | 0.3 | 0.2 | 0.2 | 0.2 | 0.2 | | |
| Penford 280 | | | | | | | | 2 | 2 | | |
| PVOH | | | | | | 0.5 | 0.5 | | | | |
| Finnfix 10 | | | | | | | | | | 0.8 | 0.8 |
| Calsan 50 | 1 | 1 | 1 | 1 | 1 | 1 | 1 | 1 | 1 | 1 | 1 |
| Solids | 68.5 | 68.5 | 68.5 | 68.5 | 68.5 | 68.5 | 68.5 | 67.5 | 67.5 | 67.7 | 67.7 |
| Brookfield visc. @ 100 RPM | 2624 | 3068 | 3256 | 3040 | 3100 | 1980 | 1920 | 3324 | 3272 | 2508 | 2260 |
| Hercules High Shear Viscosity | 61.0 | 63.5 | 71.4 | 66.3 | 74.5 | 46.2 | 58.5 | 68.0 | 68.6 | 41.3 | 42.2 |

The coating formulations were applied on standard free sheet basestock using a Modern Metal Kraft bench coater. The base sheet included no fluorescent whitening agents. The coat weight target was 12.5 gsm. All papers were calendered using a supercalender with one nip and 500 pounds per linear inch.

Figure 2:
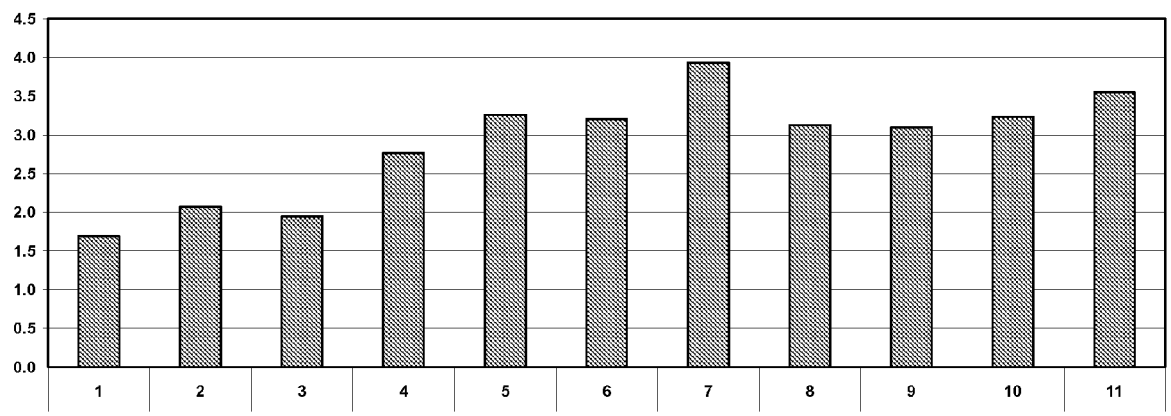
FIG. 2 is a graph showing the CIE brightness with UV included minus the CIE brightness with UV excluded of paper free sheet samples.
Figure 3:
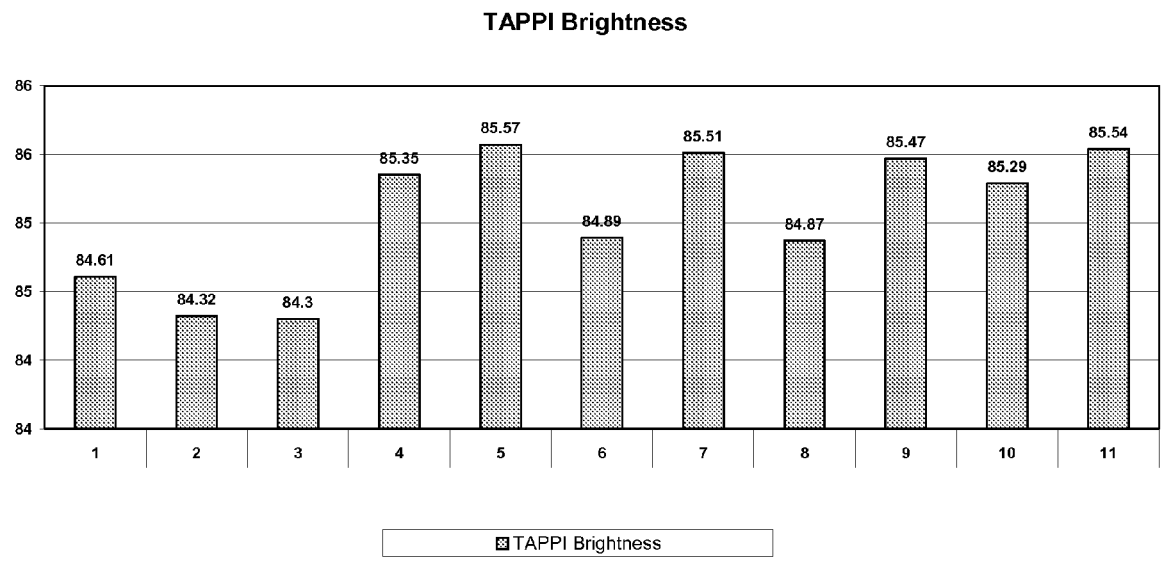
FIG. 3 is a graph showing the TAPPI brightness of paper free sheet samples.

The papers were tested for CIE and TAPPI brightness as shown in FIGS. 1-3. CIE brightness was tested with and without the ultraviolet light filtered. The "difference" between the brightness with UV light included and the UV light filtered out (or excluded) was considered an indication of the various carriers activating the fluorescent whitening agent and is shown in FIG. 2. TAPPI Test T452 was used to determine TAPPI brightness.

As can be seen from FIGS. 1-3, the maltodextrin containing binder of Examples 1 and 2 enhances coating brightness. This is particularly evident in comparing the Styronal® BN 4606 latex formulation and Comparative Examples 1 and 2 directly to Examples 1 and 2. The improved optical brightener activation of the binder copolymer derived from maltodextrin was evident even in formulations that contained no activators.

Figure 4:
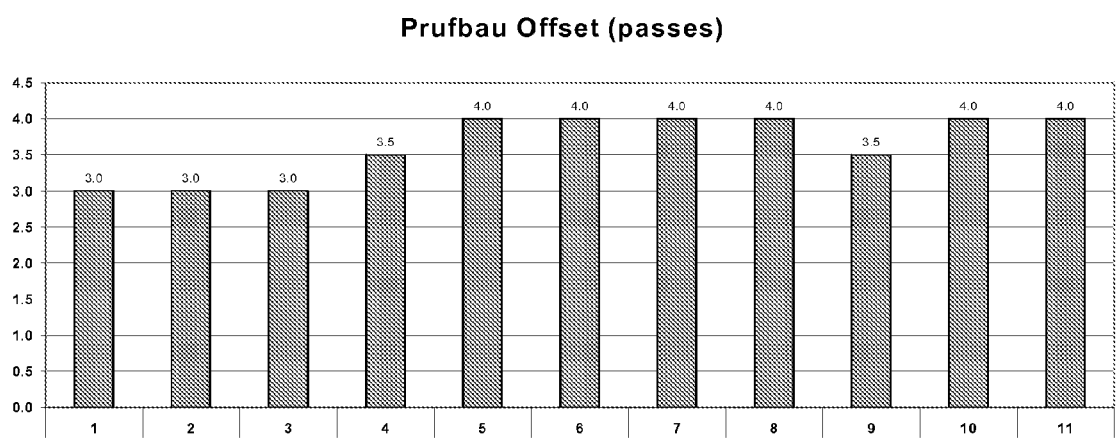
FIG. 4 is a graph showing the Prufbau Offset for paper free sheet samples.
Figure 5:
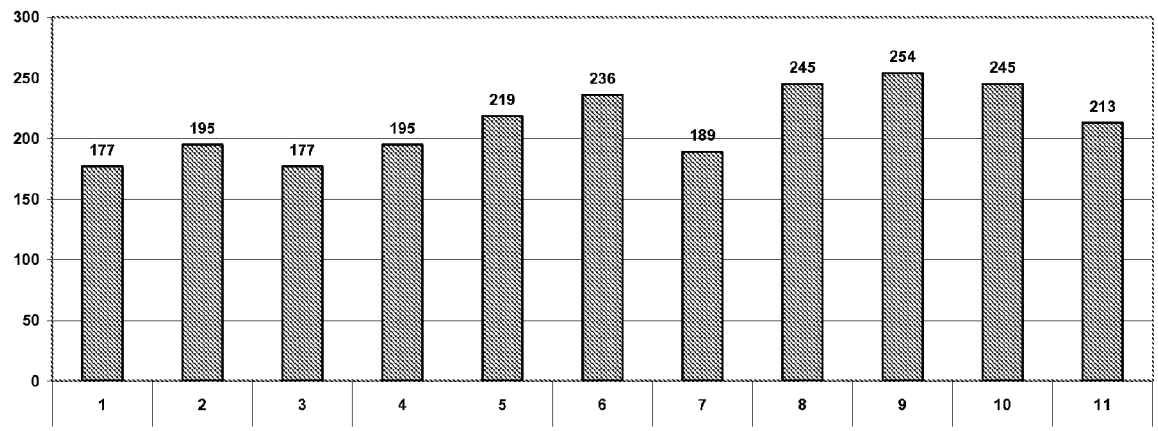
FIG. 5 is a graph showing the IGT Dry Pick in ft/min for paper free sheet samples.
Figure 6:
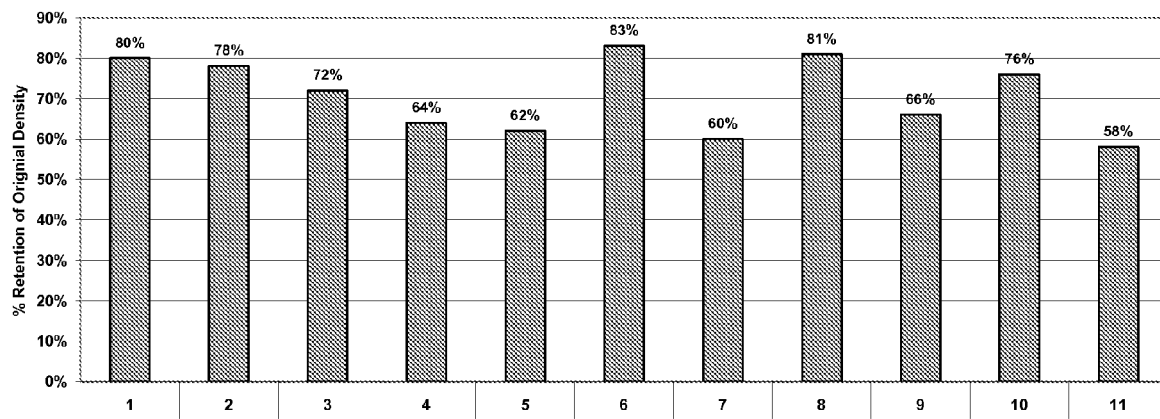
FIG. 6 is a graph showing the Prufbau Wet Pick of paper free sheet samples.

Pick testing was also performed on the test papers. In particular, the Prufbau offset test, IGT dry pick test and Prufbau wet pick tests were all performed on the paper including the test formulations. FIG. 4 is a graph showing the Prufbau Offset for paper using the tested compositions and this test was conducted as described above. FIG. 5 is a graph showing the IGT Dry Pick in ft/min for paper using the tested compositions and these tests were carried out using TAPPI Test 499. FIG. 6 is a graph showing the Prufbau wet pick of paper using the tested compositions and this test was also conducted as described above.

As can be seen in FIG. 4, the binder copolymers derived from maltodextrin (Examples 1 and 2) displayed improved offset test results. This improvement was clearly seen in the formulations where no activators were used. In formulations that used an activator such as a water insoluble starch, PVOH or CMC, no appreciable differences in passes to failure were observed.

IGT dry pick results are provided in FIG. 5. The average IGT of the Styronal® BN 4606 latex sample, Comparative Example 1 and Comparative Example 2 where no activator was utilized was 183 ft/min while the average IGT of Examples 1 and 2 (using the binder copolymers derived from maltodextrin) without activators was 207 ft/min. However, when PVOH or CMC was utilized as the activator, the Styronal® BN 4606 and Comparative Examples 1 and 2 indicated slightly higher but comparable strength compared to the binder copolymer derived from maltodextrin (Examples 1 and 2).

Prufbau wet pick tests are provided in FIG. 6. These results show that the binder copolymer derived from maltodextrin provided lower wet pick resistance versus the Styronal® BN 4606 example and Comparative Examples 1 and 2. It should be noted however, that the examples did not include any crosslinking agents and these are typically included in all-synthetic, wood-free grades, which would have increased the wet pick strength of the binder copolymers derived from maltodextrin. For example, a glyoxal type crosslinker could be included in the formulations based on Examples 1 and 2 for use in sheet offset formulations.

A formulation (Comparative Example 3) was prepared including 60 parts per weight calcium carbonate (HC 90 Omya), 40 parts per weight clay (Hydragloss 90 Huber), 14 parts per weight Acronal® S728 styrene acrylic latex as a binder (available from BASF Corporation), 0.2 parts per weight dispersant (Colloids 226), 0.8 parts per weight calcium stearate lubricant (Calsan® 50), 0.3 parts per weight Sterocoll® FS thickener, 2.3 parts per weight tetrasulfonated fluorescent whitening agent (Leucophor® T-100 from Clariant Paper Chemicals), and 3.3 parts per weight polyvinyl alcohol as an activator. The resulting formulation for Comparative Example 3 had 65% solids and was adjusted to a pH of 8.5 using caustic.

In Examples 3 and 4, the formulation from Comparative Example 3 was modified by modifying the Acronal® S728 latex to include 24 parts by weight maltodextrin (per 100 parts monomer weight). In addition, the amount of polyvinyl alcohol activator was 0.5 parts per weight in Example 3 and 1.0 parts per weight in Example 4, respectively.

Figure 7:
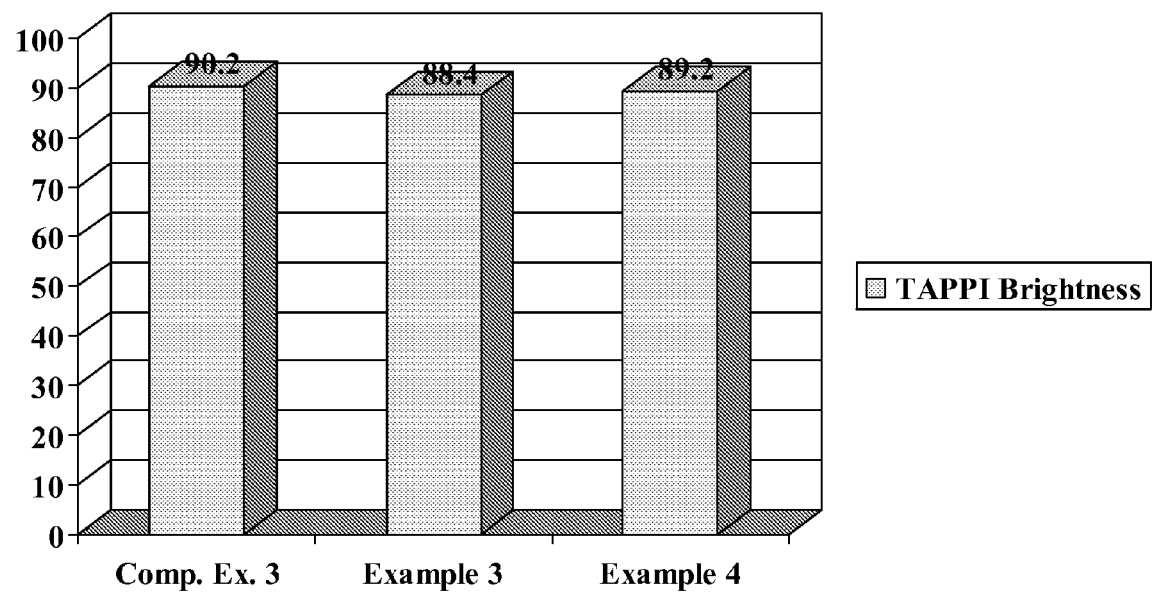
FIG. 7 is a graph showing the TAPPI brightness of paperboard samples.

FIG. 7 is a graph showing the TAPPI brightness of paperboard using Comparative Example 3, Example 3 and Example 4. As shown in this figure, the brightness values for Examples 3 and 4 with significantly less activator were comparable to the brightness value for Comparative Example 3.

Comparative Example 4 was prepared using the same formulation as Comparative Example 3 but including Styronal® BN 4606X styrene-butadiene latex as the binder. Example 5 was prepared like Comparative Example 4 except that the Styronal® BN 4606X styrene-butadiene latex was modified to include 22 parts by weight maltodextrin (per 100 parts per monomer). In addition, Example 5 did not include polyvinyl alcohol activator.

Figure 8:
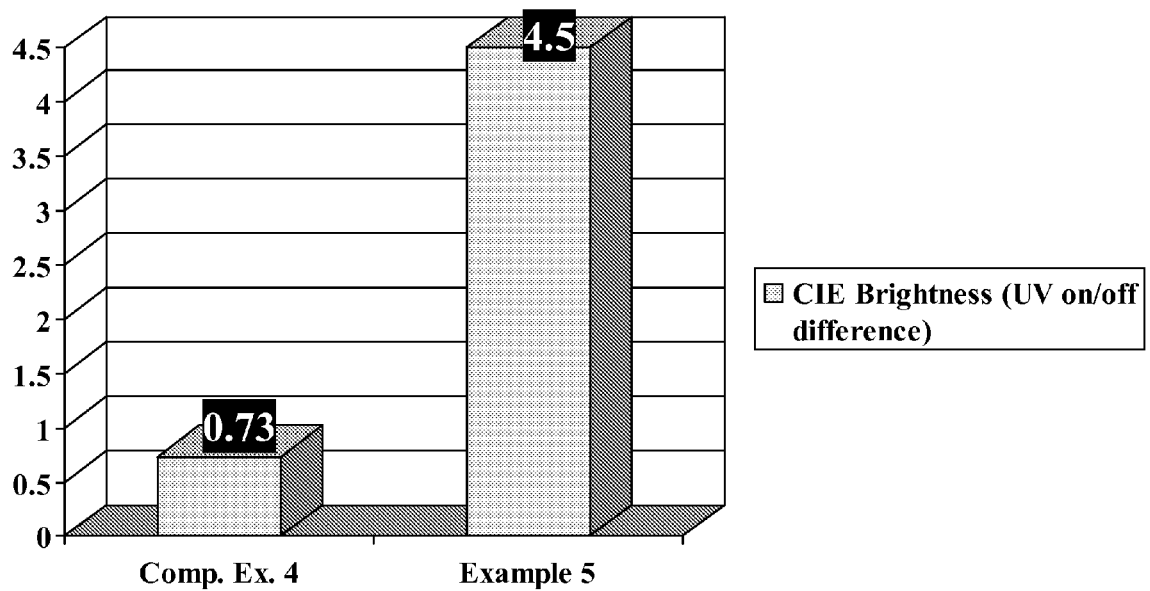
FIG. 8 is a graph showing the CIE brightness with UV included minus the CIE brightness with UV excluded of formulations applied to glass with a paper backing.

FIG. 8 is a graph showing the CIE brightness with UV included minus the CIE brightness with UV excluded of Example 5 and Comparative Example 4 when applied to glass with a paper backing. As shown in this figure, the presence of the maltodextrin in Example 5 significantly improves the CIE brightness difference of the composition, even though no activator is included.

A number of embodiments of the invention have been described. Nevertheless, it will be understood that various modifications may be made without departing from the spirit and scope of the invention. Further, while only certain representative combinations of the formulations, methods, or products are disclosed herein are specifically described, other combinations of the method steps or combinations of elements of a composition or product are intended to fall within the scope of the appended claims. Thus a combination of steps, elements, or components may be explicitly mentioned herein; however, all other combinations of steps, elements, and components are included, even though not explicitly stated.

What is claimed is:

1. A paper coating or binding formulation, comprising:
an aqueous polymer dispersion comprising a copolymer prepared by polymerizing about 58% by weight of styrene, about 38% by weight of butadiene, and about 4% by weight of itaconic and/or (meth)acrylic acid, in the presence of about 15% to about 45% by weight of a carbohydrate-derived compound having a dextrose equivalent (DE) of about 10 to about 35, based on the total weight of the styrene, the butadiene, and the itaconic and/or (meth)acrylic acid; and
a tetrasulfonate-based fluorescent whitening agent.

2. The formulation according to claim 1, wherein the carbohydrate-derived compound is selected from the group consisting of dextrins, maltodextrins, and mixtures thereof.

3. The formulation according to claim 1, wherein the DE of the carbohydrate-derived compound is from about 12.5 to about 25.

4. The formulation according to claim 1, wherein the DE of the carbohydrate-derived compound is from about 15 to about 20.

5. The formulation according to claim 1, wherein the weight average molecular weight of the carbohydrate-derived compound is from about 3,000 to about 20,000.

6. The formulation according to claim 1, wherein the weight average molecular weight of the carbohydrate-derived compound is from about 5,000 to about 17,000.

7. The formulation according to claim 1, wherein the carbohydrate-derived compound is soluble in water at room temperature in an amount of greater than about 40% by weight.

8. The formulation according to claim 1, wherein the copolymer is derived from about 15 to about 35 percent by weight of the carbohydrate-derived compound based on the total monomer weight.

9. The formulation according to claim 1, wherein the copolymer is derived from about 15 to about 40 percent by weight of the carbohydrate-derived compound based on the total monomer weight.

10. The formulation according to claim 1, wherein the aqueous polymer dispersion comprises a disperse phase and an aqueous phase and the carbohydrate-derived compound provided in the copolymer is present in the disperse phase.

11. The formulation according to claim 1, wherein said fluorescent whitening agent is not activated.

12. The formulation according to claim 1, wherein the formulation is substantially free of polyvinyl alcohol, carboxymethylcellulose, polyvinylpyrrolidone, and water-insoluble starches.

13. The formulation according to claim 1, wherein the aqueous polymer dispersion further comprises a hexasulfonate-based fluorescent whitening agent.

14. A method of preparing a paper coating or binding formulation, comprising:
polymerizing a mixture of about 58% by weight of styrene, about 38% by weight of butadiene, and about 4% by weight of itaconic and/or (meth)acrylic acid, in the presence of about 15% to about 45% by weight of a carbohydrate-derived compound having a dextrose equivalent (DE) of about 10 to about 35, based on the total weight of the styrene, the butadiene, and the itaconic and/or (meth)acrylic acid, in an aqueous medium to produce a copolymer in an aqueous polymer dispersion, and
mixing the aqueous polymer dispersion with a tetrasulfonate-based fluorescent whitening agent.

15. The method according to claim 14, wherein the carbohydrate-derived compound is selected from the group consisting of dextrins, maltodextrins, and mixtures thereof 16. The method according to claim 14, wherein the DE of the carbohydrate-derived compound is from about 12.5 to about 25.

17. The method according to claim 14, wherein the weight average molecular weight of the carbohydrate-derived compound is from about 3,000 to about 20,000.

18. The method according to claim 14, wherein said polymerizing step comprising first mixing an aqueous solution of a carbohydrate-derived compound at room temperature comprising greater than about 40% by weight of the carbohydrate-derived compound with the styrene, butadiene, and itaconic and/or (meth)acrylic acid and polymerizing the mixture to form the copolymer.

19. The method according to claim 14, wherein the copolymer is derived from about 15 to about 35 percent by weight of the carbohydrate-derived compound based on the total monomer weight.

20. The method according to claim 14, wherein said fluorescent whitening agent is not activated.

21. The method according to claim 14, wherein the formulation is substantially free of polyvinyl alcohol, carboxymethylcellulose, polyvinylpyrrolidone, and water-insoluble starches.

22. A method of improving the whitening properties of paper; comprising:
providing an aqueous polymer dispersion comprising a copolymer prepared by polymerizing about 58% by weight of styrene, about 38% by weight of butadiene, and about 4% by weight of itaconic and/or (meth)acrylic acid, in the presence of about 15% to about 45% by weight of a carbohydrate-derived compound having a dextrose equivalent (DE) of about 10 to about 35, based on the total weight of the styrene, the butadiene, and the itaconic and/or (meth)acrylic acid;
mixing the aqueous polymer dispersion with a tetrasulfonate-based fluorescent whitening agent to produce a paper coating or binding formulation; and
applying the formulation as a coating to paper.

23. The method according to claim 22, wherein said providing step comprises polymerizing the styrene, butadiene, and itaconic and/or (meth)acrylic acid and a carbohydrate-derived compound having a dextrose equivalent (DE) of about 10 to about 35, in an aqueous medium to produce the copolymer.

24. The method according to claim 22, wherein the carbohydrate-derived compound is selected from the group consisting of dextrins, maltodextrins, and mixtures thereof.

25. The method according to claim 22, wherein the DE of the carbohydrate-derived compound is from about 12.5 to about 25.

26. The method according to claim 22, wherein the weight average molecular weight of the carbohydrate-derived compound is from about 3000 to about 20,000.

27. The method according to claim 22, wherein the carbohydrate-derived compound is soluble in water at room temperature in an amount of greater than about 40% by weight.

28. The method according to claim 22, wherein the copolymer is derived from about 15 to about 35 percent by weight of the carbohydrate-derived compound based on the total monomer weight.

29. The method according to claim 22, wherein said fluorescent whitening agent is not activated.

30. The method according to claim 22, wherein the formulation is substantially free of polyvinyl alcohol, carboxymethylcellulose, polyvinylpyrrolidone and water-insoluble starches.

31. Paper comprising a fiber matrix and a binder composition comprising a copolymer prepared by polymerizing about 58% by weight of styrene, about 38% by weight of butadiene, and about 4% by weight of itaconic and/or (meth)acrylic acid, in the presence of about 15% to about 45% by weight of a carbohydrate-derived compound having a dextrose equivalent (DE) of about 10 to about 35, based on the total weight of the styrene, the butadiene, and the itaconic and/or (meth)acrylic acid; and a tetrasulfonate-based fluorescent whitening agent.

32. Paper according to claim 31, wherein the carbohydrate-derived compound is selected from the group consisting of dextrins, maltodextrins, and mixtures thereof.

33. Paper according to claim 31, wherein the DE of the carbohydrate-derived compound is from about 12.5 to about 25.

34. Paper according to claim 31, wherein the weight average molecular weight of the carbohydrate-derived compound is from about 3,000 to about 20,000.

35. Paper according to claim 31, wherein the carbohydrate-derived compound is soluble in water at room temperature in an amount of greater than about 40% by weight.

36. Paper according to claim 34, wherein the copolymer is derived from about 15 to about 32 percent by weight of the carbohydrate-derived compound based on dry polymer weight.

37. Paper according to claim 31, wherein the fluorescent whitening agent is not activated.

38. Paper according to claim 31, wherein the binder is substantially free of polyvinyl alcohol, carboxymethylcellulose, polyvinylpyrrolidone, and water-insoluble starches.

39. Paper according to claim 31, wherein the binder is provided as a coating layer on a paper substrate.

* * * * *